S. E. STAAL.
MOWER ATTACHMENT.
APPLICATION FILED AUG. 17, 1906. RENEWED OCT. 23, 1908.
922,970.
Patented May 25, 1909.
2 SHEETS—SHEET 1.
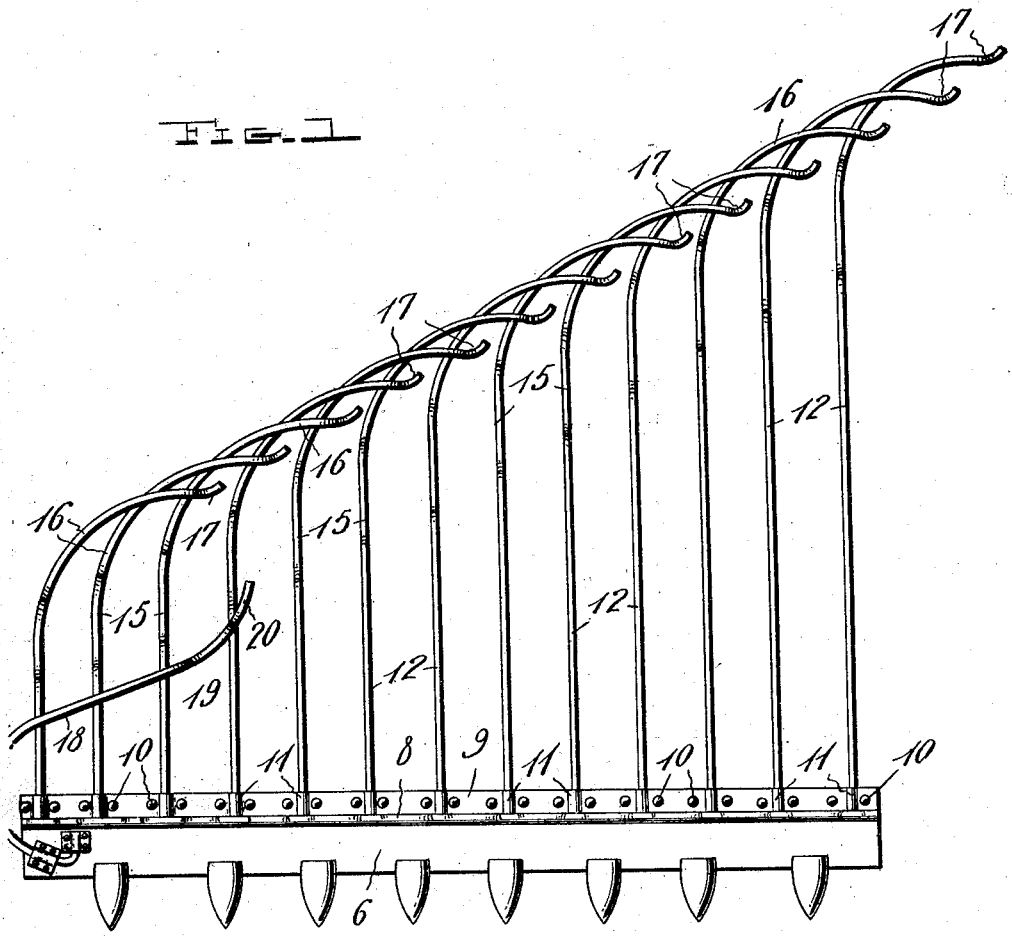
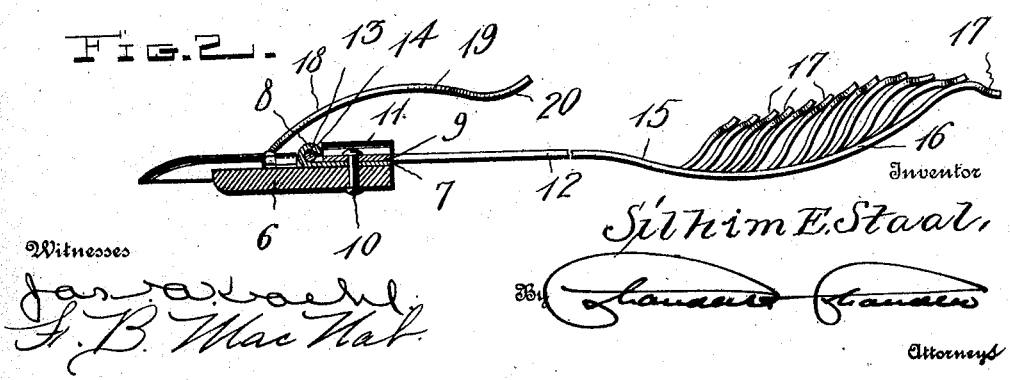

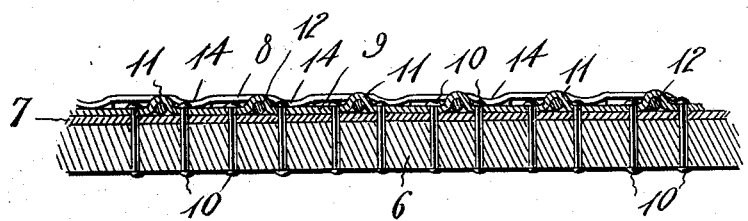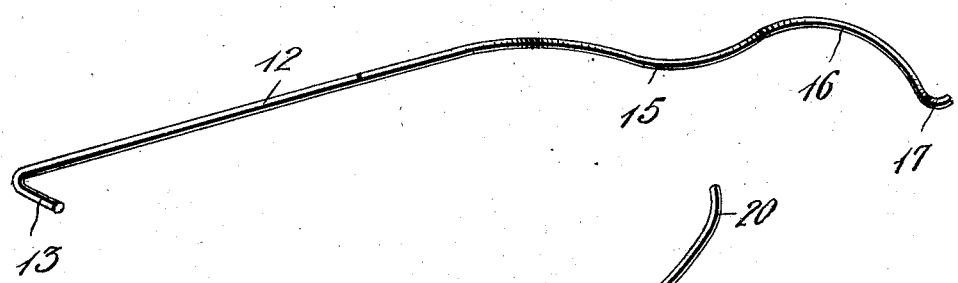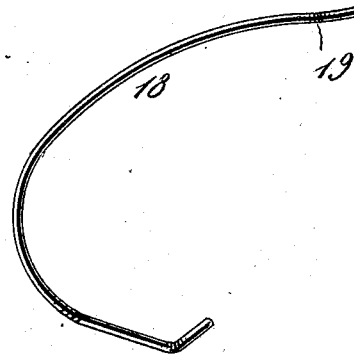

UNITED STATES PATENT OFFICE.

SILHIM E. STAAL, OF MAPLEBAY, MINNESOTA, ASSIGNOR OF ONE-HALF TO KNUDT I. HAUGEN, OF GARFIELD, MINNESOTA.

MOWER ATTACHMENT.

No. 922,970.   Specification of Letters Patent.   Patented May 25, 1909.

Application filed August 17, 1906, Serial No. 331,049.   Renewed October 23, 1908.   Serial No. 459,211.

*To all whom it may concern:*

Be it known that I, SILHIM E. STAAL, a citizen of the United States, residing at Maplebay, in the county of Polk, State of Minnesota, have invented certain new and useful Improvements in Mower Attachments; and I do hereby declare the following to be a full, clear, and exact description of the invention, such as will enable others skilled in the art to which it appertains to make and use the same.

This invention relates to mower attachments and has for its object to provide an attachment which will deliver the down grain, vines etc., to one side of the path of travel of the machine so that the said grain and vines will not be injured upon the return of the machine.

The invention has for a further object the provision of means for insuring the proper disposal of grain upon the attachment.

In the accompanying drawings, Figure 1 is a top plan view of the finger bar of a mower showing my invention applied thereto, Fig. 2 is a vertical sectional view therethrough, Fig. 3 is a detail transverse sectional view through the finger bar of the mower showing the manner of attaching the arms thereto, Fig. 4 is a detail perspective view of one of the arms, and, Fig. 5 is a similar view of the arm for directing the vines etc., upon the attachment.

Referring more specifically to the drawings, the numeral 6 denotes the finger bar of a mower and 7 a plate which is located upon the upper face of the finger bar 6 and is provided along one of its longitudinal edges with an overturned flange 8 for a purpose to be hereinafter described. A plate 9 is disposed upon the upper plate 7 and is held in position thereon by means of rivets 10 which are engaged through the plates 7 and 9 and the finger bar 6 of the mower. The plate 9 is provided at intervals throughout its length with crimped portions 11 for the engagement therebetween and the plate 7 of the end portion of the arms 12 and the said arms 12 have their extreme ends turned at right angles as at 13 and engaged beneath the overturned flange 8 of the plate 7. After the engagement of the arms 12 between the plates 7 and 9 with their right angularly bent ends underlying the overturned flange 8 of the first named plate the edge of the said flange is struck down as at 14 throughout its entire length except at such points where the bent portions in the arms join the body portions thereof.

Each of the arms 12 extends rearwardly from the finger bar of the mower and is thence curved slightly downwardly as at 15 and thence laterally and slightly upwardly as at 16. The end portion of each arm is then curved slightly downwardly and finally bent at its extreme end rearwardly and laterally as at 17. In order that the vines and grain will be delivered from the attachment in a continuous roll, the arms are successively lengthened with respect to each other from one side of the machine to the other.

An arm 18 is located at that end of the finger bar at which the shorter arms 12 are located and extends upwardly and slightly laterally therefrom and is thence curved downwardly as at 19 and upwardly at its end as at 20. The function of this arm is to direct the grain and vines upon the arms 12 and to prevent their delivery from the wrong end of the attachment.

It will be understood that the vines and grain having been deposited upon the arms 12, will be moved therefrom by means of the stubble which projects through the said arms when the mower is traveling over the field.

It is to be understood that I do not desire to be limited to the exact details of construction shown and described for obvious modifications will occur to a person skilled in the art.

What is claimed is—

1. In a device of the class described the combination with the finger bar of a mower, of plates secured to the finger bar, one of said plates being provided along one of its edges with an overturned flange, and arms received between said plates and having one of their ends bent to lie beneath the overturned flange of the above stated plate.

2. In a device of the class described the combination with the finger bar of the mower, of plates secured upon the finger bar, one of said plates being provided along one of its edges with an overturned flange, arms received between the plates, said arms having one of their ends bent laterally and engaged beneath said overturned flange.

In testimony whereof, I affix my signature, in presence of two witnesses.

SILHIM E. STAAL.

Witnesses:
  C. O. SINGLEY,
  W. E. ROWE.